(12) United States Patent
Kim

(10) Patent No.: US 12,501,152 B2
(45) Date of Patent: Dec. 16, 2025

(54) REAL-TIME PACKING MANAGEMENT DEVICE IMPLEMENTED AS AUXILIARY SYSTEM INTERWORKING WITH MAIN SYSTEM

(71) Applicant: Inbet Co., Ltd., Seoul (KR)

(72) Inventor: Jong Cheol Kim, Seoul (KR)

(73) Assignee: Inbet Co., Ltd., Seoul (KR)

( * ) Notice: Subject to any disclaimer, the term of this patent is extended or adjusted under 35 U.S.C. 154(b) by 210 days.

(21) Appl. No.: 18/029,894

(22) PCT Filed: Oct. 7, 2021

(86) PCT No.: PCT/KR2021/013773
§ 371 (c)(1),
(2) Date: Mar. 31, 2023

(87) PCT Pub. No.: WO2022/080756
PCT Pub. Date: Apr. 21, 2022

(65) Prior Publication Data
US 2023/0370716 A1    Nov. 16, 2023

(30) Foreign Application Priority Data
Oct. 12, 2020   (KR) .................. 10-2020-0130914

(51) Int. Cl.
*H04N 23/661* (2023.01)
*G06Q 10/087* (2023.01)
*H04N 7/18* (2006.01)

(52) U.S. Cl.
CPC ......... *H04N 23/661* (2023.01); *G06Q 10/087* (2013.01); *H04N 7/181* (2013.01); *H04N 7/188* (2013.01)

(58) Field of Classification Search
CPC ...... H04N 23/661; H04N 7/181; H04N 7/188; G06Q 10/087
USPC .......................................................... 348/159
See application file for complete search history.

(56) References Cited

U.S. PATENT DOCUMENTS 9,790,029 B2   10/2017   Kim

FOREIGN PATENT DOCUMENTS

| KR | 10-2002-0084751 A | 11/2002 |
|----|-------------------|---------|
| KR | 10-2013-0089935 A | 8/2013 |
| KR | 10-1515962 B | 4/2015 |
| KR | 10-1545232 B1 | 8/2015 |
| KR | 10-2017-0088754 A | 8/2017 |
| KR | 10-2018-0059005 A | 6/2018 |
| KR | 10-2009300 A | 8/2019 |

OTHER PUBLICATIONS

International Search Report mailed Jan. 14, 2022 for International Application No. PCT/KR2021/013773 and its English translation.
Non-final Office Action mailed Nov. 28, 2022 for Korean Application No. 10-2020-0130914.

*Primary Examiner* — Nguyen T Truong
(74) *Attorney, Agent, or Firm* — Insight Law Group, PLLC; Seung Lee

(57) ABSTRACT

The present invention relates to a real-time packing management device implemented as an auxiliary system interworking with a main system, and prevents a decrease in work efficiency of a worker by minimizing an article packing management operation interfering with a main task.

9 Claims, 4 Drawing Sheets

REAL-TIME PACKING MANAGEMENT DEVICE IMPLEMENTED AS AUXILIARY SYSTEM INTERWORKING WITH MAIN SYSTEM

CROSS-REFERENCE TO RELATED APPLICATIONS

This application is a 371 national phase entry of International Application No. PCT/KR2021/013773, filed Oct. 7, 2021, which claims the benefit of Korean Patent Application No. 10-2020-0130914, filed Oct. 12, 2020, in the Korean Intellectual Property Office, the disclosures of which are incorporated herein in their entirety by reference.

TECHNICAL FIELD

The present invention relates to an article packing management technology, and more particularly, to a real-time packing management device implemented as an auxiliary system interworking with a main system.

BACKGROUND ART

Korean Patent Registration No. 10-1515962 (registered on Apr. 22, 2015), which is previously applied and registered by the applicant of the present invention, suggests a real-time packing management device capable of minimizing loss and stress for a packing company at a time at which a customer claim due to a delivery accident occurs by efficiently managing an image, which was taken during a process of packing an article, to be provided to the customer, who receives the delivery article, when the customer claim due to the delivery accident occurs.

In addition, Korean Patent Registration No. 10-1866513 (registered on Jun. 4, 2018), which is previously applied and registered by the applicant of the present invention, suggests a conveyor transfer type article packing management system capable of improving article packing management efficiency by realizing that task images for a plurality of boxes are simultaneously and sequentially captured for each article packing area, and minimizing loss and stress for a packing company by providing a customer with the article packing task images when the customer claim due to a delivery accident occurs.

The article packing management devices or systems may be operated independently, but in practice, most of the article packing management devices or systems are implemented as auxiliary systems interworking with a main system such as a warehouse management system (WMS), an order management system (OMS), or a transport management system (TMS).

When the article packing management device is implemented as an auxiliary system interworking with a main system, there is a problem in that work efficiency of a worker is lowered because operations of the worker for article packing management with which logistics warehouse management, order management, and transport management tasks, which are main tasks, are interfered are additionally generated.

DISCLOSURE

Technical Problem

The present invention is directed to providing a real-time packing management device implemented as an auxiliary system interworking with a main system, which is capable of minimizing an article packing management operation interfering with a main task which may occur when an article packing management device is implemented as an auxiliary system interworking with a main system.

Technical Solution

One aspect of the present invention provides a real-time packing management device implemented as an auxiliary system interworking with a main system, the real-time packing management device including a web server unit network-linked to a main system, a command generation unit configured to generate an image-capturing start command or an image-capturing end command according to a remote control command from the main system connected through the web server unit, and an image-capturing control unit configured to transmit the image-capturing start command or the image-capturing end command generated by the command generation unit to a camera, and control the camera to start or end capturing an image of a packing process of a delivery article.

According to an additional aspect of the present invention, the remote control command may be an electronic code for starting or ending image-capturing.

According to an additional aspect of the present invention, the web server unit may include a connection processing unit configured to process a web connection of the main system, an electronic code reception unit configured to receive the electronic code for starting or ending image-capturing from the main system web-connected by the connection processing unit, and an electronic code analysis unit configured to analyze the electronic code received by the electronic code reception unit to detect whether the electronic code is the remote control command for starting image-capturing or the remote control command for ending image-capturing.

According to an additional aspect of the present invention, the web server unit may further include a state information transmission unit configured to transmit state information of the real-time packing management device to the web-connected main system.

According to an additional aspect of the present invention, the image-capturing control unit may perform collective image-capturing control by collectively transmitting the image-capturing start command or the image-capturing end command to each of a plurality of cameras installed for each article packing task section of an individual packing operation method.

According to an additional aspect of the present invention, the image-capturing control unit may perform sequential image-capturing control by sequentially transmitting the image-capturing start command or the image-capturing end command to each of a plurality of cameras installed for each article packing task section of a conveyor transfer method.

According to an additional aspect of the present invention, when the electronic code for starting image-capturing and the electronic code for ending image-capturing are the same code, the electronic code analysis unit may determine whether the electronic code is the remote control command for starting image-capturing or the remote control command for ending image-capturing according to the number of times of recognition.

According to an additional aspect of the present invention, when the electronic code for starting image-capturing and the electronic code for ending image-capturing are different codes, the electronic code analysis unit may determine whether the electronic code is the remote control command for starting image-capturing or the remote control command for ending image-capturing according to recognized code identification information.

According to an additional aspect of the present invention, the web server unit may further include an image management unit configured to upload an article packing task image captured by the camera to a cloud server.

According to an additional aspect of the present invention, the real-time packing management device may further include an area monitoring unit configured to monitor a specific area of a screen of a worker personal computer (PC) in a situation, in which the main system cannot be interworked, to recognize pre-normalized characters, generate a local control command for starting image-capturing or a local control command for ending image-capturing, and transmit the local control command to the command generation unit.

Advantageous Effects

According to the present invention, an article packing management operation interfering with a main task, which may occur when an article packing management device is implemented as an auxiliary system interworking with a main system, can be minimized, so that there is an effect of preventing a decrease in work efficiency of a worker.

MODES OF THE INVENTION

Figure 1:
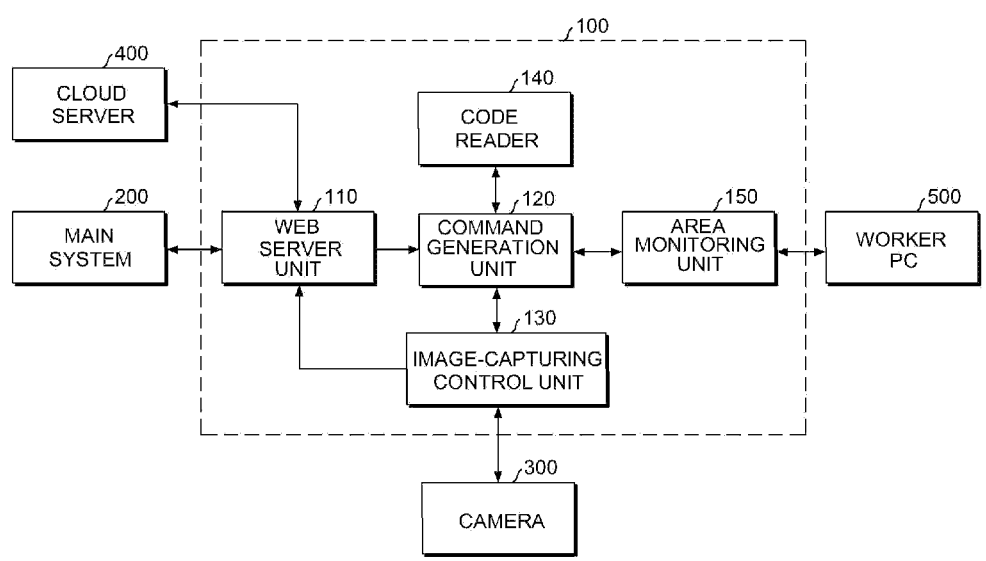
FIG. 1 is a block diagram illustrating a configuration of one embodiment of a real-time packing management device implemented as an auxiliary system interworking with a main system according to the present invention.

Hereinafter, the present invention will be described in detail so that those skilled in the art can easily understand and reproduce the present invention through exemplary embodiments described with reference to the accompanying drawings. Although specific embodiments are illustrated in the drawings and related detailed descriptions are described, this is not intended to limit the various embodiments of the present invention to a specific form.

In describing the present invention, when it is determined that a detailed description of a related known function or configuration may unnecessarily obscure the subject matter of the embodiments of the present invention, a detailed description thereof will be omitted.

When a component is referred to as being "connected" or "coupled" to another component, it is understood that it may be directly connected or coupled to another component, but still another component may exist therebetween.

Conversely, when a component is referred to as being "directly connected" or "directly coupled" to another component, it should be understood that there is no other component therebetween.

FIG. 1 is a block diagram illustrating a configuration of one embodiment of a real-time packing management device implemented as an auxiliary system interworking with a main system according to the present invention. The real-time packing management device is implemented as an auxiliary system that interworks with a main system according to the present embodiment.

As shown in FIG. 1, a real-time packing management device 100 implemented as an auxiliary system interworking with a main system according to the present embodiment includes a web server unit 110, a command generation unit 120, and an image-capturing control unit 130.

The web server unit 110 is network-linked to a main system 200. For example, the main system 200 may include a warehouse management system (WMS), an order management system (OMS), a transport management system (TMS), or the like.

The real-time packing management device 100 is implemented as an auxiliary system that interworks with the main system 200 through the web server unit 110, receives a remote control command from the main system 200 registered through a request packet and a response packet transmitted on the basis of transmission control protocol/Internet protocol (TCP/IP), and transmits state information to the registered main system 200.

The web server unit 110 has a function of registering the main system 200 that remotely controls the real-time packing management device 100, which is operating as an auxiliary system, in real time, and may issue and manage an ID and a password for connecting to the web server unit 110 to the main system 200.

The main system 200 that remotely controls the real-time packing management device 100 operating as an auxiliary system in real time accesses the web server unit 110 using the issued ID and password, and remotely controls the real-time packing management device 100. In this case, the main system 200 may be equipped with a remote control application (app) (not shown in the drawing) for an article packing management operation in order to minimize the article packing management operation that interferes with a main task performed by the main system 200.

For example, the remote control app for the article packing management operation may be implemented to be executed in the background of a main app (not shown in the drawing) performing the main task to minimize interference with the main task performed by the main app.

The command generation unit 120 generates an image-capturing start command or an image-capturing end command according to the remote control command from the main system 200 connected through the web server unit 110. In this case, the remote control command may be an electronic code for starting or ending image-capturing.

For example, the electronic code for starting or ending image-capturing may be a barcode or a quick response (QR) code, but the present invention is not limited thereto. Meanwhile, the electronic code for starting image-capturing and the electronic code for ending image-capturing may be the same code or different codes.

The image-capturing control unit 130 transmits the image-capturing start command or the image-capturing end command generated by the command generation unit 120 to a camera 300, and controls the camera 300 to start or end capturing an image of a packing process of a delivery article.

A plurality of cameras 300 may be installed for each article packing task section of an individual packing operation method, may be installed for each article packing task section of a conveyor transfer method, and may be installed in the same packing task section.

For example, it may be implemented such that the image-capturing control unit 130 performs collective image-capturing control by collectively transmitting the image-capturing start command or the image-capturing end command to each of the plurality of cameras installed for each article packing task section of the individual packing operation method.

Alternatively, it may be implemented such that the image-capturing control unit 130 performs sequential image-capturing control by sequentially transmitting the image-capturing start command or the image-capturing end command to each of the plurality of cameras installed for each article packing task section of the conveyor transfer method.

The camera 300, which has received the image-capturing start command or the image-capturing end command transmitted by the image-capturing control unit 130, starts or ends capturing an article packing task image.

By implementing in this way, in the present invention, the article packing management operation of the article packing management device 100 implemented as an auxiliary system interworking with the main system 200 may be remotely controlled in the main system in a web connection manner.

In this case, the remote control app for the article packing management operation is mounted in the main system 200 in order to minimize the article packing management operation interfering with the main task performed by the main system 200, and the main app performing the remote control app is executed in the background of the main app performing the main task, thereby minimizing the interference with the main task.

Accordingly, in the present invention, since the article packing management operation interfering with the main task which may occur when the article packing management device is implemented as an auxiliary system interworking with the main system may be minimized, a decrease in work efficiency of a worker may be prevented.

Figure 2:
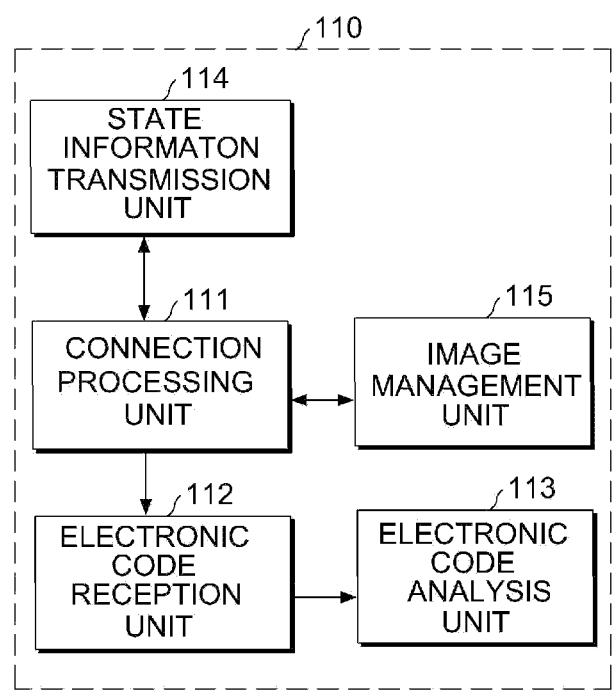
FIG. 2 is a block diagram illustrating a configuration of one embodiment of a web server unit of the real-time packing management device implemented as an auxiliary system interworking with a main system according to an embodiment of the present invention.

FIG. 2 is a block diagram illustrating a configuration of one embodiment of the web server unit of the real-time packing management device implemented as an auxiliary system interworking with the main system according to the present invention. As shown in FIG. 2, the web server unit 110 may include a connection processing unit 111, an electronic code reception unit 112, and an electronic code analysis unit 113.

The connection processing unit 111 processes the web connection of the main system 200. The connection processing unit 111 issues an ID and a password for connecting to the web server unit 110 to the main system 200, registers the ID and the password, and allows connection to the web server unit 110 when the main system 200 requests to connect to the web server unit 110 using the issued ID and password.

The electronic code reception unit 112 receives the electronic code for starting or ending image-capturing from the main system web-connected by the connection processing unit 111. For example, the electronic code for starting or ending image-capturing may be a barcode or a QR code, but the present invention is not limited thereto. Meanwhile, the electronic code for starting image-capturing and the electronic code for ending image-capturing may be the same code or different codes.

The electronic code analysis unit 113 analyzes the electronic code received by the electronic code reception unit 112 to detect whether the electronic code is a remote control command for starting image-capturing or a remote control command for ending image-capturing.

In this case, it may be implemented such that, when the electronic code for starting image-capturing and the electronic code for ending image-capturing are the same code, the electronic code analysis unit 113 determines whether the electronic code is the remote control command for starting image-capturing or the remote control command for ending image-capturing according to the number of times of recognition.

For example, it may be implemented such that, when the electronic code analyzed by the electronic code analysis unit 113 is an invoice number and the invoice number is first recognized by the electronic code analysis unit 113, this is determined as the remote control command for starting image-capturing, and when the same invoice number is recognized once again, this is determined as the remote control command for ending image-capturing.

Meanwhile, it may be implemented such that, when the electronic code for starting image-capturing and the electronic code for ending image-capturing are different codes, the electronic code analysis unit 113 determines whether the electronic code is the remote control command for starting image-capturing or the remote control command for ending image-capturing according to recognized code identification information.

For example, it may be implemented such that, when the electronic code analyzed by the electronic code analysis unit 113 is a unique code corresponding to the remote control command for starting image-capturing, the electronic code is determined as the remote control command for starting image-capturing, and when the electronic code analyzed by the electronic code analysis unit 113 is a unique code corresponding to the remote control command for ending image-capturing, the electronic code is determined as the remote control command for ending image-capturing.

When whether the electronic code is the remote control command for starting image-capturing or the remote control command for ending image-capturing is detected by the electronic code analysis unit 113, the command generation unit 120 generates the image-capturing start command or the image-capturing end command.

Then, the image-capturing control unit 130 transmits the image-capturing start command or the image-capturing end command generated by the command generation unit 120 to the camera 300, and controls the camera 300 to start or end capturing an image of a packing process of a delivery article.

By implementing in this way, in the present invention, the article packing management operation of the article packing management device 100 implemented as an auxiliary system interworking with the main system 200 may be remotely controlled in the main system in a web connection manner.

In this case, the remote control app for the article packing management operation is mounted in the main system 200 in order to minimize the article packing management operation interfering with the main task performed by the main system 200, and the remote control app is executed in the background of the main app performing the main task, thereby minimizing the interference with the main task.

Accordingly, in the present invention, since the article packing management operation interfering with the main task which may occur when the article packing management device is implemented as an auxiliary system interworking with the main system may be minimized, a decrease in work efficiency of a worker may be prevented.

Meanwhile, according to an additional aspect of the invention, the web server unit 110 may further include a state information transmission unit 114. The state information transmission unit 114 transmits state information of the real-time packing management device 100 to the web-connected main system 200.

In this case, the state information of the real-time packing management device refers to digital information indicating whether the camera is in an image-capturing standby state since it is a state of waiting for a packing task or in an image-capturing state since it is a state of performing a packing task.

For example, it may be implemented such that, when the state information has binary bits "00", this indicates that the camera is in a state of waiting for image-capturing, and when the state information has binary bits "01", this indicates that the camera is a state of image-capturing, but the present invention is not limited thereto.

When the main system 200 web-connects through the web server unit 110 and requests transmission of state information of the real-time packing management device, the state information transmission unit 114 responds by detecting current state information of the real-time packing management device and transmitting the state information of the real-time packing management device to the web-connected main system 200.

By implementing in this way, the main system 200 may confirm a current state of the real-time packing management device 100 interworked with the auxiliary system, that is, may confirm whether the camera is in an image-capturing standby state since it is a state of waiting for a packing task or in an image-capturing state since it is a state of performing a packing task.

Meanwhile, according to an additional aspect of the invention, the web server unit 110 may further include an image management unit 115. The image management unit 115 uploads an article packing task image captured by the camera 300 to a cloud server 400.

In this case, the article packing task image uploaded by the image management unit 115 and stored in the cloud server 400 may be stored by matching with unique information such as an invoice number.

Accordingly, a customer may be connected to the cloud server 400 by using a smart phone possessed by the customer, and may confirm an article packing task image matched with unique information such as an invoice number assigned to the customer.

Meanwhile, the image management unit 115 may be implemented to prevent memory capacity consumption and speed degradation by uploading an article packing task image to the cloud server 400 and then deleting the article packing task image from a non-volatile memory thereof.

Meanwhile, according to an additional aspect of the present invention, the real-time packing management device 100 implemented as an auxiliary system interworking with the main system may be implemented to be embedded in the camera 300.

When the real-time packing management device 100 is implemented in the form of software embedded in the camera 300 rather than software executed in a separate control personal computer (PC), space waste for installing the separate control PC may be prevented.

Meanwhile, according to an additional aspect of the present invention, the real-time packing management device 100 implemented as an auxiliary system interworking with the main system may further include a code reader 140.

When a network failure occurs in the web server unit 110 and thus the electronic code from the main system 200 cannot be recognized, the code reader 140 directly recognizes an offline barcode or QR code attached to an article, an article packing box, or the like at a local level so that the article packing task image is captured.

Accordingly, even when a network failure occurs in the web server unit 110, an offline barcode or QR code attached to an article, an article packing box, or the like may be directly recognized through the code reader 140 at a local level, and the article packing task image can be captured, thereby stably acquiring the article packing task image.

Meanwhile, according to an additional aspect of the invention, the real-time packing management device 100 implemented as an auxiliary system interworking with the main system may further include an area monitoring unit 150. The area monitoring unit 150 monitors a specific area of a screen of a worker PC 500 in a situation, in which the main system 200 cannot be interworked, to recognize pre-normalized characters, generates a local control command for starting image-capturing or a local control command for ending image-capturing, and transmits the local control command to the command generation unit 120.

Then, the command generation unit 120 generates an image-capturing start command or an image-capturing end command according to the local control command for starting image-capturing or the local control command for ending image-capturing, and the image-capturing control unit 130 transmits the image-capturing start command or the image-capturing end command generated by the command generation unit 120 to the camera 300 to control the camera 300 to start or end capturing an image of a packing process of a delivery article.

Figure 3:
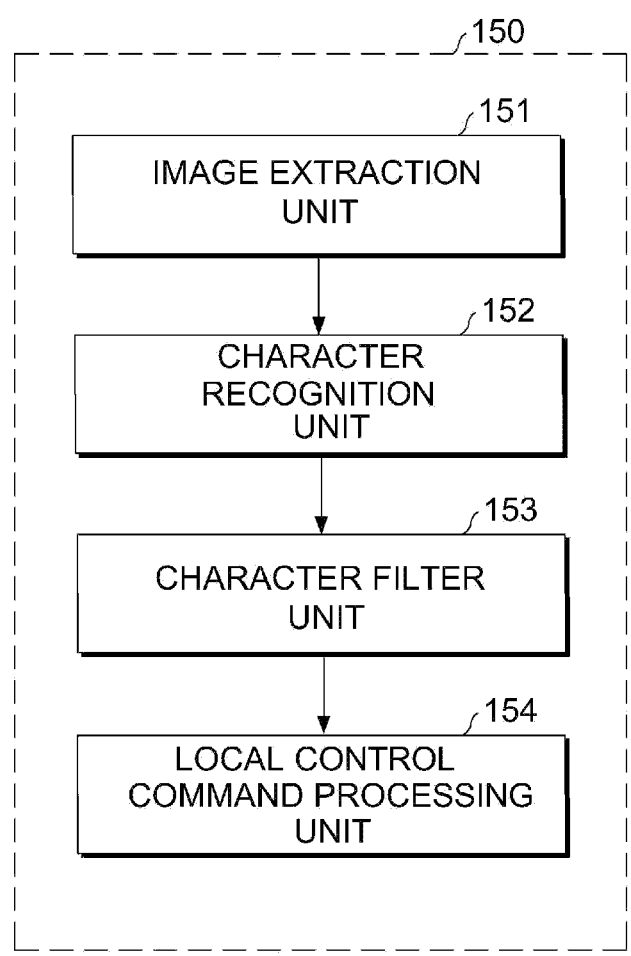
FIG. 3 is a block diagram illustrating a configuration of an area monitoring unit of the real-time packing management device implemented as an auxiliary system interworking with a main system according to the present invention.

FIG. 3 is a block diagram illustrating a configuration of the area monitoring unit of the real-time packing management device implemented as an auxiliary system interworking with the main system according to the present invention. Referring to FIG. 3, the area monitoring unit 150 may include an image extraction unit 151, a character recognition unit 152, a character filter unit 153, and a local control command processing unit 154.

The image extraction unit 151 extracts a specific area image of a screen of the worker PC by monitoring the specific area of the screen of the worker PC. The character recognition unit 152 recognizes characters from the specific area image of the screen of the worker PC extracted by the image extraction unit 151.

The character filter unit 153 filters pre-normalized characters from among the characters recognized by the character recognition unit 152. For example, the normalized characters filtered by the character filter unit 153 may be an invoice number, an order number, or a product number.

The local control command processing unit 154 recognizes the pre-normalized characters, generates a local control command for starting image-capturing or a local control command for ending image-capturing, and transmits the local control command to the command generation unit 120.

By implementing in this way, in the present invention, in a situation in which the main system 200 cannot be interworked, the specific area of the screen of the worker PC 500 may be monitored to recognize the pre-normalized characters, and a local control command for starting image-capturing or a local control command for ending image-capturing may be generated, so that the article packing task image can be captured.

An operation of capturing an article packing task image by the real-time packing management device 100 implemented as an auxiliary system interworking with the main system according to the present invention as described above will be described with reference to FIG. 4.

Figure 4:
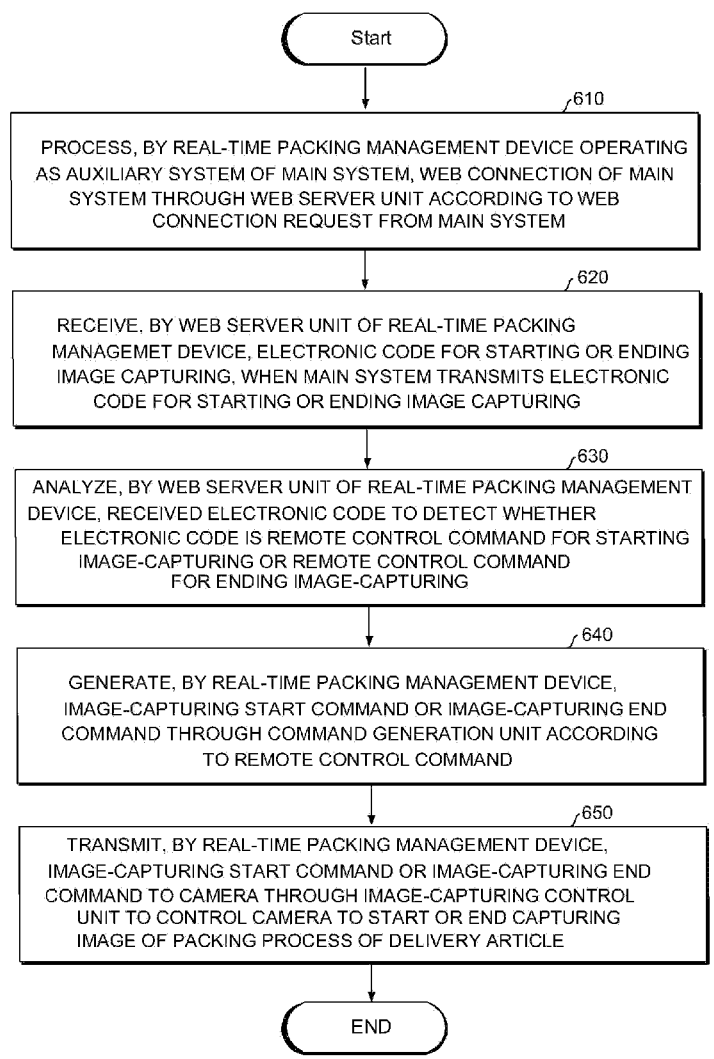
FIG. 4 is a flowchart illustrating an example of an operation of capturing an article packing task image by the real-time packing management device implemented as an auxiliary system interworking with a main system according to the present invention.

FIG. 4 is a flowchart illustrating an example of an operation of capturing an article packing task image by the real-time packing management device implemented as an auxiliary system interworking with the main system according to the present invention.

In operation 610, according to a web connection request from the main system, the real-time packing management device operating as an auxiliary system of the main system processes a web connection of the main system through the web server unit.

When the main system, which is web-connected by the web server unit of the real-time packing management device in operation 610, transmits an electronic code for starting or ending image-capturing, in operation 620, the web server unit of the real-time packing management device receives the electronic code for starting or ending image-capturing.

Thereafter, in operation 630, the web server unit of the real-time packing management device analyzes the received electronic code to detect whether the electronic code is a remote control command for starting image-capturing or a remote control command for ending image-capturing.

Thereafter, in operation 640, the real-time packing management device generates an image-capturing start command or an image-capturing end command through the command generation unit according to the remote control command detected in operation 630.

In addition, in operation 650, the real-time packing management device transmits the image-capturing start command or the image-capturing end command generated in operation 640 to the camera through the image-capturing control unit to control the camera to start or end capturing an image of a packing process of a delivery article.

Then, the camera, which has received the image-capturing start command or the image-capturing end command transmitted by the image-capturing control unit of the real-time packing management device, starts or ends capturing an article packing task image.

By implementing in this way, in the present invention, the article packing management operation of the article packing management device 100 implemented as an auxiliary system interworking with the main system 200 may be remotely controlled in the main system in a web connection manner.

In this case, the remote control app for the article packing management operation is mounted in the main system 200 in order to minimize the article packing management operation interfering with the main task performed by the main system 200, and the remote control app is executed in the background of the main app performing the main task, thereby minimizing the interference with the main task.

Accordingly, in the present invention, since the article packing management operation interfering with the main task, which may occur when the article packing management device is implemented as an auxiliary system interworking with the main system, may be minimized, a decrease in work efficiency of a worker may be prevented.

It should be understood that various embodiments disclosed in the present specification and the drawings are only illustrative of specific examples for purposes of facilitating understanding and are not intended to limit the scope of the various embodiments of the present invention.

Accordingly, the scope of the various embodiments of the present invention should be construed that all changes or modifications derived from the technical idea of the various embodiments of the present invention are included in the scope of the various embodiments of the present invention in addition to the embodiments described herein.

INDUSTRIAL APPLICABILITY

The present invention is applicable to an article packing management technology and an application technology thereof for industrial use.

The invention claimed is:

1. A real-time packing management device implemented as an auxiliary system interworking with a main system, the real-time packing management device comprising:
   a web server unit network-linked to a main system;
   a command generation unit configured to generate an image-capturing start command or an image-capturing end command according to a remote control command from the main system connected through the web server unit;
   an image-capturing control unit configured to transmit the image-capturing start command or the image-capturing end command generated by the command generation unit to a camera, and control the camera to start or end capturing an image of a packing process of a delivery article; and
   an area monitoring unit configured to monitor a specific area of a screen of a worker personal computer (PC) in a situation, in which the main system cannot be interworked, to recognize pre-normalized characters, generate a local control command for starting image-capturing or a local control command for ending image-capturing, and transmit the local control command to the command generation unit.

2. The real-time packing management device of claim 1, wherein the remote control command is an electronic code for starting or ending image-capturing.

3. The real-time packing management device of claim 2, wherein the web server unit includes:
   a connection processing unit configured to process a web connection of the main system;
   an electronic code reception unit configured to receive the electronic code for starting or ending image-capturing from the main system web-connected by the connection processing unit; and
   an electronic code analysis unit configured to analyze the electronic code received by the electronic code reception unit to detect whether the electronic code is the remote control command for starting image-capturing or the remote control command for ending image-capturing.

4. The real-time packing management device of claim 3, wherein the web server unit further includes a state information transmission unit configured to transmit state information of the real-time packing management device to the web-connected main system.

5. The real-time packing management device of claim 1, wherein the image-capturing control unit performs collective image-capturing control by collectively transmitting the image-capturing start command or the image-capturing end command to each of a plurality of cameras installed for each article packing task section of an individual packing operation method.

6. The real-time packing management device of claim 1, wherein the image-capturing control unit performs sequential image-capturing control by sequentially transmitting the image-capturing start command or the image-capturing end command to each of a plurality of cameras installed for each article packing task section of a conveyor transfer method.

7. The real-time packing management device of claim 3, wherein, when the electronic code for starting image-capturing and the electronic code for ending image-capturing are the same code, the electronic code analysis unit determines whether the electronic code is the remote control command for starting image-capturing or the remote control command for ending image-capturing according to the number of times of recognition.

8. The real-time packing management device of claim 3, wherein, when the electronic code for starting image-capturing and the electronic code for ending image-capturing are different codes, the electronic code analysis unit determines whether the electronic code is the remote control command for starting image-capturing or the remote control command for ending image-capturing according to recognized code identification information.

9. The real-time packing management device of claim 3, wherein the web server unit further includes an image management unit configured to upload an article packing task image captured by the camera to a cloud server.

* * * * *